United States Patent
Thyrvin et al.

(10) Patent No.: US 12,455,253 B2
(45) Date of Patent: Oct. 28, 2025

(54) ESTIMATING THE THERMAL RESISITIVITY OF SOIL SURROUNDING AN UNDERGROUND CABLE

(71) Applicant: NKT HV Cables AB, Lyckeby (SE)

(72) Inventors: Ola Thyrvin, Karlskrona (SE); Vilhelm Rydén, Karlskrona (SE)

(73) Assignee: NKT HV Cables AB, Lyckeby (SE)

( * ) Notice: Subject to any disclaimer, the term of this patent is extended or adjusted under 35 U.S.C. 154(b) by 444 days.

(21) Appl. No.: 18/054,755

(22) Filed: Nov. 11, 2022

(65) Prior Publication Data
US 2023/0152260 A1 May 18, 2023

(30) Foreign Application Priority Data

Nov. 12, 2021 (EP) .................................... 21208054

(51) Int. Cl.
*G01N 25/18* (2006.01)
*G01N 33/24* (2006.01)
(52) U.S. Cl.
CPC ............. *G01N 25/18* (2013.01); *G01N 33/24* (2013.01)
(58) Field of Classification Search
CPC ............................... G01N 25/18; G01N 33/24
See application file for complete search history.

(56) References Cited

U.S. PATENT DOCUMENTS

| | | |
|---|---|---|
| 2005/0125174 A1 | 6/2005 | Nam et al. |
| 2015/0253458 A1* | 9/2015 | Purnhagen ............ G01K 11/32 374/136 |

FOREIGN PATENT DOCUMENTS

| | | | | |
|---|---|---|---|---|
| CN | 107907567 A | * | 4/2018 | ............ G01N 25/18 |
| DE | 102015109493 A1 | * | 10/2016 | ............ G01B 21/08 |
| EP | 3470889 A2 | | 4/2019 | |
| EP | 3470889 A3 | | 8/2019 | |
| KR | 20160035642 A | * | 4/2016 | |

OTHER PUBLICATIONS

Extended European Search Report; Application No. 21208054.3; Completed: Apr. 15, 2022; Apr. 29, 2022; 8 Pages.

* cited by examiner

*Primary Examiner* — Mirellys Jagan
(74) *Attorney, Agent, or Firm* — Whitmyer IP Group LLC

(57) ABSTRACT

The invention is concerned with a method, arrangement, computer program and computer program product for estimating the thermal resistivity of soil surrounding an underground cable. The arrangement comprises a thermal resistivity estimating unit that obtains a first temperature ($T_s$) from a first temperature sensor at an exterior surface of the cable, obtains a second temperature ($T_a$) from a second temperature sensor placed in the soil at a distance from the cable, obtains a measurement of current ($I_c$) transmitted in the cable and estimates the thermal resistivity of soil based on the first and the second temperatures ($T_s$, $T_a$) as well as on the current measurement ($I_c$).

16 Claims, 4 Drawing Sheets

ESTIMATING THE THERMAL RESISITIVITY OF SOIL SURROUNDING AN UNDERGROUND CABLE

TECHNICAL FIELD

The invention relates to electric cables, for instance in relation to high voltages. More particularly, the invention relates to a method, arrangement, computer program and computer program product for estimating the thermal resistivity of soil.

BACKGROUND

The thermal properties of soil and especially the thermal resistivity may be important to know in relation to underground power cables. This property may for instance be of interest in cable load protection systems, such as for predicting a so-called power overload, i.e. a load that is higher than what the cable is rated for.

US 2015/0253458 describes estimating thermal properties of soil as well as using such properties for cable rating and cable reconducting. In order to determine the thermal properties of the soil a weather driven method is used that is essentially based on the difference between the temperature of the air and the soil. Also, other properties above ground are considered, such as wind speed, solar input and radiation. The way that the soil properties are determined is thereby complex and requires weather data, which can be hard to obtain. It would therefore be of interest to use a simpler way of determining the thermal resistivity, for instance one that does not depend on weather data.

Aspects of the invention are concerned with improvements in relation to the determination of the thermal resistivity of soil and especially one that does not need weather data.

SUMMARY

One object of the invention is therefore to provide a simple determining of the thermal resistivity of soil, for instance one that does not depend on weather data.

This is according to a first aspect achieved through a method for estimating the thermal resistivity of soil surrounding an underground cable, the method being performed by a thermal resistivity estimating unit and comprising:
obtaining a first temperature from a first temperature sensor at an exterior surface of the cable,
obtaining a second temperature from a second temperature sensor placed in the soil at a distance from the cable,
obtaining a measurement of current transmitted in the cable, and
estimating the thermal resistivity of soil based on the first and the second temperatures as well as on the current measurement.

The object is according to a second aspect achieved through an arrangement for estimating the thermal resistivity of soil, the arrangement comprising:
a thermal resistivity estimating unit configured to,
obtain a first temperature from a first temperature sensor at an exterior surface of the cable,
obtain a second temperature from a second temperature sensor placed in the soil at a distance from the cable,
obtain a measurement of current transmitted in the cable, and
estimate the thermal resistivity of soil based on the first and the second temperatures as well as on the current measurement.

The object is according to a third aspect achieved through a computer program for estimating the thermal resistivity of soil surrounding an underground cable, the computer program comprising computer program code which when run by a processor of a thermal resistivity estimating device, causes the thermal resistivity estimating device to:
obtain a first temperature from a first temperature sensor at an exterior surface of the cable,
obtain a second temperature from a second temperature sensor placed in the soil at a distance from the cable,
obtain a measurement of current transmitted in the cable, and estimate the thermal resistivity of soil based on the first and the second temperatures as well as on the current measurement.

The object is according to a fourth aspect achieved through a computer program product for estimating the thermal resistivity of soil surrounding an underground cable, the computer program product comprising computer program code according to the third aspect.

The invention according to the above-mentioned aspects has a number of advantages. It allows safe overload operation combined with low safety margins. Thereby the cable can be more efficiently used compared with when no or an inadequate estimation of the thermal resistivity of soil is made. Furthermore, the number of sensors used can be low and also combined with use for other purposes, such as overload operations. This means that the invention can be implemented in a simple way.

The first temperature may be a temperature that depends on the operation of the cable, while the distance at which the second temperature sensor is placed or located may be such that the second temperature is uninfluenced by the operation of the cable. It is thus uninfluenced by changes of the first temperature caused by operation of the cable.

The estimation of the thermal resistivity of soil may be based on an estimate of the temperature at the exterior surface of the cable caused by power losses in the cable when the measured current is running in the cable.

The estimation of the thermal resistivity may additionally be based on a difference between the estimated temperature and the measured temperature at the exterior surface of the cable.

The estimation of the thermal resistivity of the soil may furthermore be iterative and involve predicting a following thermal resistivity of the soil based on a combination of a previous thermal resistivity of the soil and the difference between the estimated temperature and the measured temperature at the exterior surface of the cable.

The estimation of the resistivity of the soil may also be based on applying the current measurement and the temperatures in a thermal model of the cable and possibly also of the soil. If the soil is included, the model may consider the soil up to the previously mentioned distance at which the second temperature sensor is located.

The estimating may more particularly comprise applying a previous estimate of thermal resistivity of the soil in the model together with a previous current measurement and previous first and second temperatures and obtaining a following estimate of the thermal resistivity based on processing of the previous thermal resistivity, the previous current measurement and the previous first and second temperatures in the model.

The application in the model may provide an estimated following first temperature and the estimated following thermal resistivity may be determined as a combination of the previous thermal resistivity and an error, which error is the difference between the measured following first temperature and the estimated following first temperature. It is additionally possible that the error is amplified before being combined with the previous thermal resistivity.

The cable may comprise a number of layers of cable material around at least one conductor.

In this case the model may comprise a number of thermal resistances and a number of thermal capacitances and each cable material layer may have a corresponding thermal resistance in the model and the soil may have one or more thermal resistances in the model corresponding to one or more soil layers between the cable and the second temperature sensor. Furthermore, a first thermal capacitance may be the thermal capacitance of the conductor and a part of a first neighbouring layer, the last thermal capacitance may be the thermal capacitance of the soil at the second temperature sensor and half of a neighbouring soil layer, where the thermal capacitances in-between the first and the last thermal capacitances may be made up of the capacitances of half of two neighbouring layers.

The thermal resistances may be connected in series in a string, where the first thermal capacitance may be connected to a first end of the string and the last thermal capacitance may be connected to a second opposite end of the string, while the rest of the thermal capacitances may each be connected to a corresponding junction between two thermal resistances of the string.

The first temperature may additionally be the temperature at the junction in the model between the thermal resistance of the last layer of the cable and the thermal resistance of a first soil layer and the second temperature may be the temperature after the thermal resistance of a last soil layer.

The current may correspond to a heat flow being fed into the model by a heat source. The estimation of the thermal resistance of the soil may be based on the power being input into the cable by the measured current.

The arrangement may additionally comprise the first and the second sensor.

It is also possible that the arrangement comprises the control system for controlling the transmission of power through the cable.

The first temperature sensor may be a temperature sensor in a first group of sensors comprising at least one sensor at the exterior surface of the cable, which first group comprises at least the first temperature sensor. The second temperature sensor may be a temperature sensor in a second group of sensors placed in the soil at a distance from the cable, which second group comprises at least the second temperature sensor. The arrangement may thereby also comprise the first and the second groups of sensors.

The arrangement may additionally comprise the cable as well as possibly also a current sensor used for detecting the current running in the cable.

The arrangement may furthermore comprise an overload operation determining unit configured to determine overload operating conditions based on the estimated thermal resistivity of the soil.

The method may in a similar manner comprise determining overload operating conditions based on the estimated thermal resistivity of the soil.

The determining of overload operating conditions may comprise determining an overload power level and/or an overload time duration at which the cable may be operated in an overload operating mode.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

The invention is generally directed towards an electric underground cable, i.e. an underground power cable, such as a Direct Current (DC) underground cable like a High Voltage Direct Current (HVDC) underground cable, for instance operated at 100 kV and above. It should here be realized that the invention is not limited to these types of electric cables, but may also be used in relation to for instance Alternating Current (AC) underground cables and for cables at other voltage levels. The invention is more particularly concerned with estimating the thermal resistivity of soil surrounding such a cable.

Figure 1:
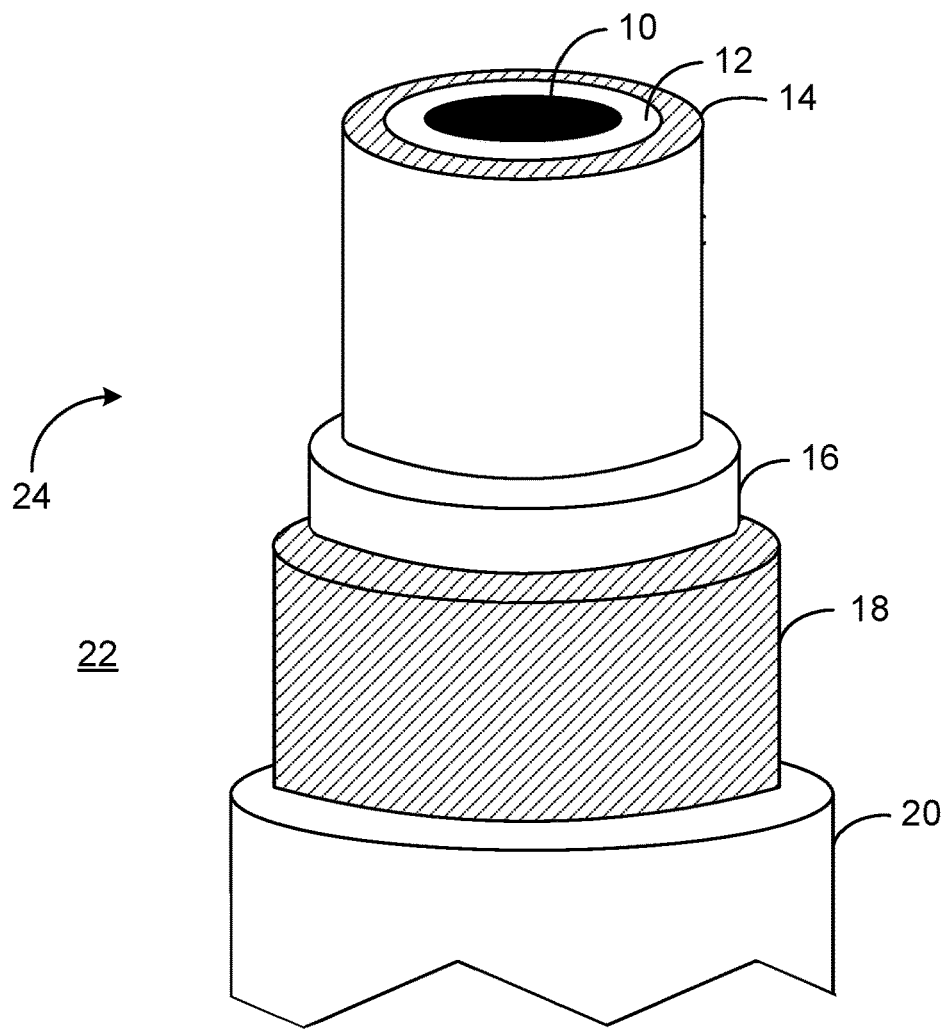
FIG. 1 schematically shows a perspective view of an end of a power cable.

FIG. 1 schematically shows an end portion 24 of a first such DC cable 22. The cable is an insulated electric high voltage DC cable 22 and comprises from inside and out: a high voltage DC conductor 10, a polymer-based insulation system 12-16, a grounding layer 18, and an outer covering or sheath 20. In this example the insulating system comprises a first insulating layer 12 inside a second insulating layer 14 and a third insulating layer 16 outside of the second insulating layer 14. The first insulating layer 12 may be a first semiconductive insulating layer, the second insulating layer 14 may be a main insulating layer and the third insulating layer 16 may be a second semiconductive insulating layer. It should here also be realized that the third layer, i.e. the second semiconductive insulating layer may be omitted. It is also possible with more layers in the insulating system. It can thereby be seen that the cable comprises a number of layers of cable material around the conductor.

Furthermore, the cable may also comprise further layers such as an inner water blocking layer and a conductor screen layer between the conductor 20 and the insulation system 12-16 as well as a second water blocking layer between the grounding layer 18 and the sheath 20.

Figure 2:
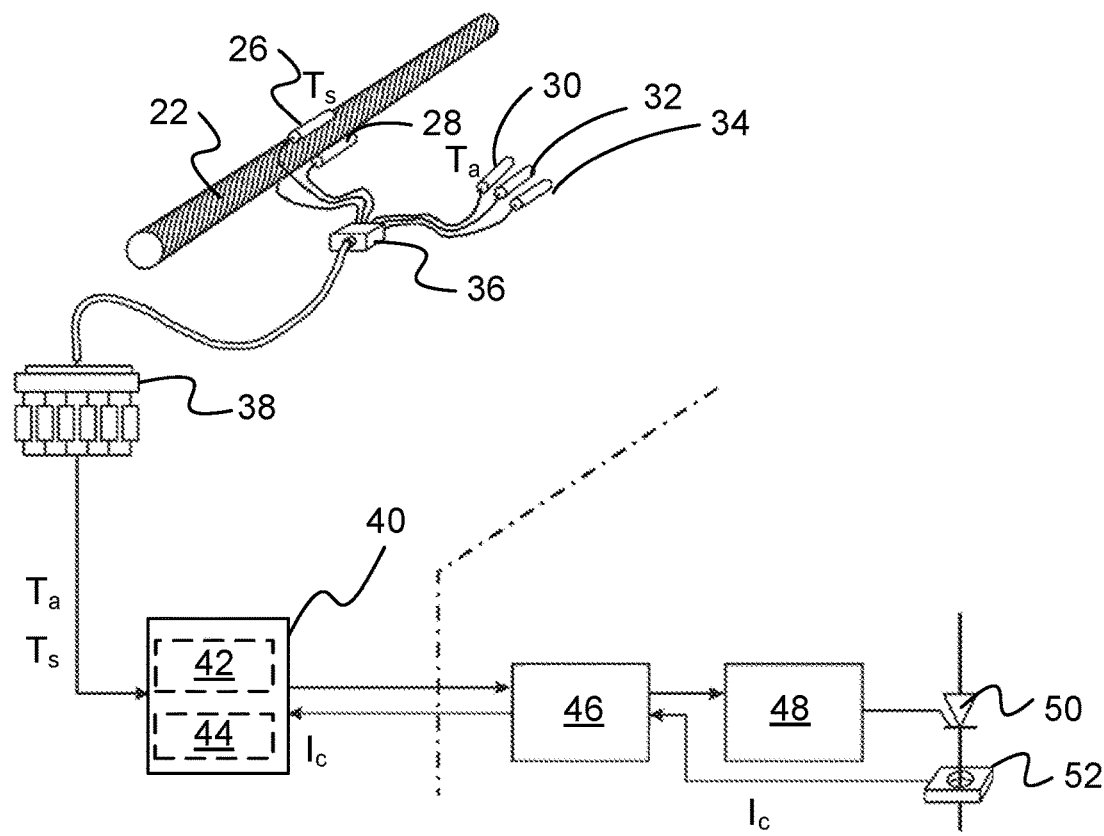
FIG. 2 schematically shows a thermal resistivity estimating arrangement comprising a first group of temperature sensors on the surface of the power cable a second group of temperature sensor in the soil as well as a first realization of a thermal resistivity estimating device comprising a thermal resistivity estimating unit and communicating with a control system that controls the transmission of power over the power cable, FIG. 3 schematically shows a second realization of thermal resistivity estimating device.

FIG. 2 schematically shows an arrangement for estimating the thermal resistivity of soil together with parts of a control system that controls the transmission of power over a power cable. The arrangement comprises a thermal resistivity estimating device 40 that comprises a thermal resistivity estimating unit 42 and optionally also an overload operation determining unit 44. The thermal resistivity estimating device 40 is connected to a first temperature sensor 26 placed on the surface of a cable 22 and to a second temperature sensor 30 placed in the soil at a distance from the cable 22. The first sensor 26 may be separated from the sheath 20 by a patch of separating material, such as a patch of polyethylene (PE). The first sensor 26 may be a sensor in a first group of sensors placed on the exterior surface of the cable 22, where in the figure a further sensor 28 in this first group is shown. In a similar manner the second sensor 30 may be a sensor in a second group of sensors, where in the figure two further sensors 32 and 34 in the second group are shown. The distance from the cable at which each sensor in the second group is placed may be such that that temperatures detected by the sensors in the second group are uninfluenced by the operation of the cable 22. The distance is thus such that any heating caused by the transmission of power through the cable 22 will not be able to propagate to the sensors of the second group. It should thereby be realized that the distances between individual sensors in the second group and the cable may differ slightly, as long as the temperature sensing is uninfluenced by the operation of the cable 22.

The first and second groups of temperature sensors are more particularly connected to a signal collecting device 36, which in turn is connected to a connection box 38, where the connection box 38 is in turn connected to the thermal resistivity estimating device 40. It can be seen that the thermal resistivity estimating device 40 receives a first temperature $T_s$ from the first temperature sensor 26 via the signal collecting device 36 and the connection box 38 as well as a second temperature $T_a$ from the second temperature sensors 30 via the signal collecting device 36 and the connection box 38, where the first temperature $T_s$ is the temperature of the exterior surface of the cable 22 and the second temperature $T_a$ is the ambient temperature at the above-mentioned distance from the cable 22. The thermal resistivity estimating device 40 may of course also receive temperature measurements from the other temperature sensors of the first and the second group. However, as will be seen later, these temperatures are not essential for the estimating of the thermal resistivity of the soil. Consequently, only the first and the second temperature sensor 26 and 30 may be used and the other sensors may be omitted.

The temperature sensors 26, 28, 30, 32 and 34 as well as the signal collecting device 36 and connection box 38 may or may not be a part of the thermal resistivity estimating arrangement. Also, the cable 22 may or may not be a part of the thermal resistivity estimating arrangement.

The thermal resistivity estimating device 40 also communicates with a high-level process control computer 46 of a process control system, which high-level process control computer may be part of a Supervisory Control and Data Acquisition (SCADA) process control system. The high-level process control computer 46 in turn communicates with a local low level control device 48 controlling a converter, which converter controls transmission of power through the cable 22. The converter may be a line-commutated converter (LCC) employing thyristors. The control of such a converter is indicated through the local low-level control device 48 controlling a thyristor 50.

It should here be realized that an LCC is merely one example of a converter that can be used. It is likewise possible with a voltage source converter (VSC) such as a two- or a multilevel converter. If a multilevel converter is used, it may additionally be a modular multilevel converter (MMC).

The current $I_c$ being input to the cable is also measured by a current sensor 52, which current sensor may report the measured current $I_c$ to the high-level process control computer 46, which may in turn submit the measured current $I_c$ to the thermal resistivity estimating device 40.

It is possible that one or more of the high-level process control computer 46, local low level control device 48, converter and current sensor 52 is a part of the thermal resistivity estimating arrangement. The control system may thereby be a part of the arrangement. However, the elements may also be external to the thermal resistivity estimating arrangement.

The thermal resistivity estimating unit 42 and the overload operation determining unit 44 of the thermal resistivity estimating device 40 may according to a first realization be implemented through one or more integrated circuits such as through a Programmable Logic Controller (PLC). However, also other alternatives are possible such as a digital signal processor (DSP), an Application Specific Integrated Circuit (ASIC) or a Field-Programmable Gate Array (FPGA).

Figure 3:
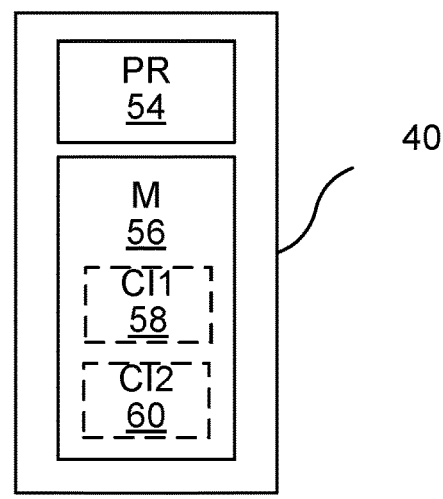

Alternatively, the thermal resistivity estimating device 40 may according to a second realization be provided in the form of a processor with associated program memory including computer program code for performing its functionality. FIG. 3 schematically shows such a realization where the thermal resistivity estimating device 40 is implemented as a processor PR 54 comprising a memory M 56 comprising first computer instructions CI1 58 for implementing the thermal resistivity estimating unit 42 and second computer instructions CI2 for implementing the overload operation determining unit 44.

When using or operating a cable it may be of interest to know the thermal resistivity of the ambient soil, i.e. of the soil that surrounds the cable.

This may for instance be of interest if operating the cable with an overload, i.e. at power levels that are higher than those that the cable is rated for. If this resistivity is known, it is possible to safely operate at a higher power level than if the resistivity is unknown or poorly estimated.

Such a resistivity is also typically not fixed but may vary depending on atmospheric and seasonal weather variations. Dampness, frost in the ground and thaw are examples of weather variations that influence the thermal resistivity.

Aspects of the present invention are directed towards estimating the thermal resistivity of soil in a simple way with a limited number of inputs that are obtained during operation of the cable. The inputs used do furthermore not need to concern weather and temperatures above ground. Therefore, they may be obtained using sensors at or around the cable.

Figure 4:
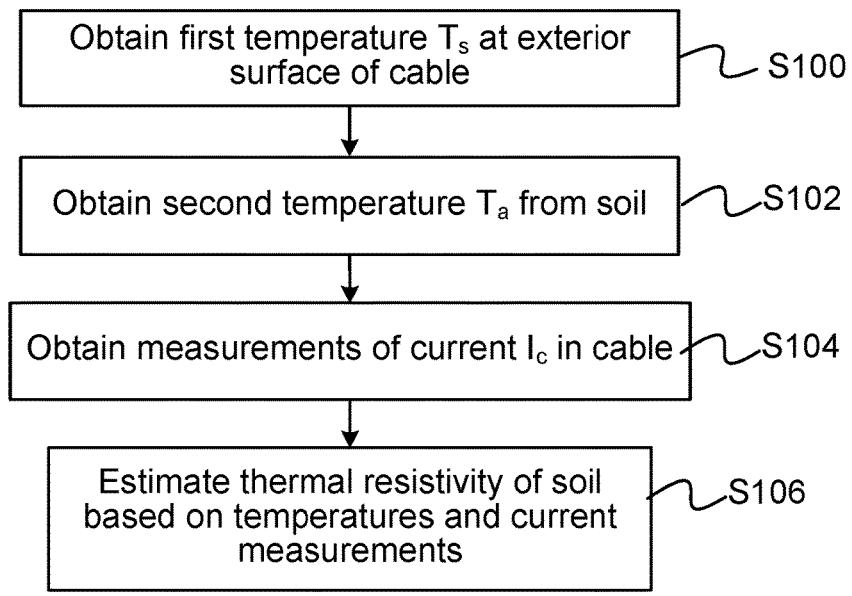
FIG. 4 shows a flow chart of a first embodiment of a method of estimating the thermal resistivity of the soil, which method steps are being performed in the thermal resistivity estimating unit, FIG. 5 schematically shows a scheme used for estimating the thermal resistivity of the soil, FIG. 6 schematically shows a thermal model of the cable employed in the estimating scheme.

How this may be done according to a first embodiment will now be described with reference also being made to FIG. 4, which shows a flow chart of a number of method steps in a method of estimating the thermal resistivity of the soil surrounding the cable, which method steps are being carried out by the thermal resistivity estimating unit 42.

The thermal resistivity estimating unit 42 obtains the first temperature $T_s$ from the first temperature sensor 26 at the exterior surface of the cable 22, S100, where the first temperature is a temperature that depends on the operation of the cable. It also obtains the second temperature $T_a$ from the second temperature sensor 30 being placed or located at a distance from the exterior surface of the cable 22, S102, which distance is such that the second temperature is uninfluenced by the operation of the cable. These temperatures may be received from the sensors 26 and 30 via the signal collection device 36 and the connection box 38, where it is additionally possible that the connection box suppresses transients of the detected temperatures. The connection box 38 may additionally provide galvanic separation between the signal collecting device 36 and the thermal resistivity estimating device 40.

The thermal resistivity estimating unit 42 also obtains a measurement of the current $I_c$ transmitted in the cable 22, S104. The current may be detected by the current sensor 52 and submitted to the high-level control computer 46, which may in turn supply it to the thermal resistivity estimating device 40. As an alternative it is possible that the thermal resistivity estimating device 40 communicates directly with the current sensor 52.

When the thermal resistivity estimating unit 42 has obtained these measurements, it goes on and estimates the thermal resistivity of soil based on the first and the second temperatures $T_s$, $T_a$ as well as on the current measurement $I_c$, S106.

The estimation of the thermal resistivity may be based on an estimate of the temperature at the exterior surface of the cable 22 caused by the power losses in the cable when the measured current runs in the cable. This may be done through applying the measured temperatures and current in a model of the cable, which model possibly also models the soil up to the previously mentioned distance. The estimation of the thermal resistivity may more particularly be based on a difference between the estimated temperature and the measured temperature at the exterior surface of the cable 22. The estimation of the thermal resistivity may be iterative. It may more particularly be based on processing made at discrete consecutive points in time, so-called sampling times and may involve the predicting of a following thermal resistivity of the soil based on a combination of the above-mentioned difference and a previous thermal resistivity of the soil, where it is additionally possible that the difference is the difference between an estimated temperature and a measured temperature at the following point in time, where the estimation of the temperature at the following point in time has been made based on measurements made at the previous point in time.

Figure 5:
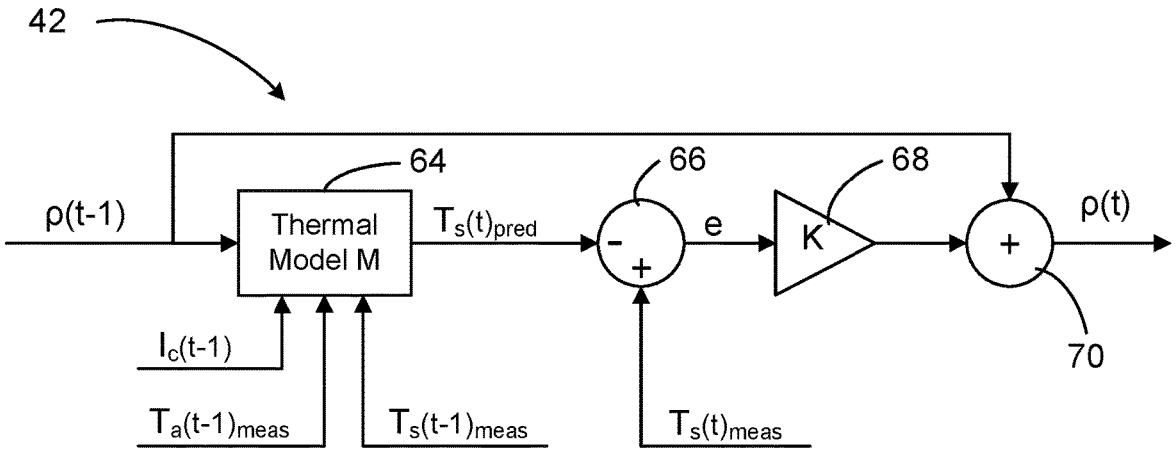
Figure 6:
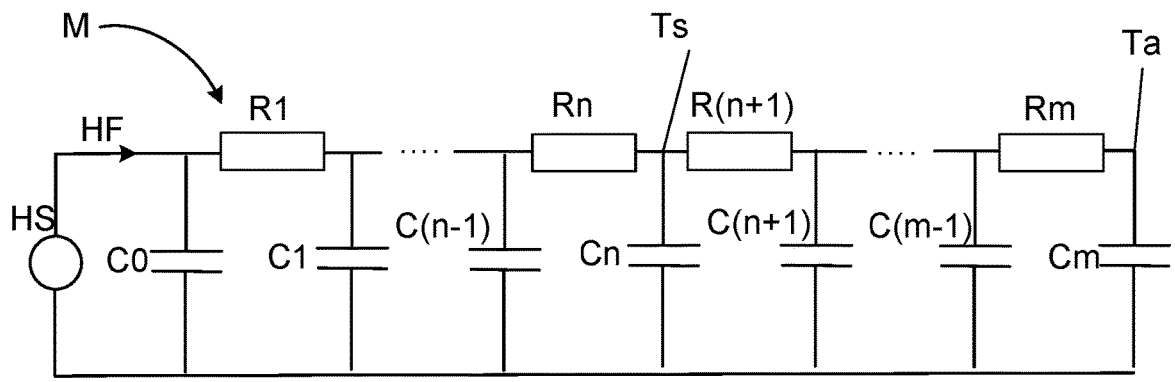
Figure 7:
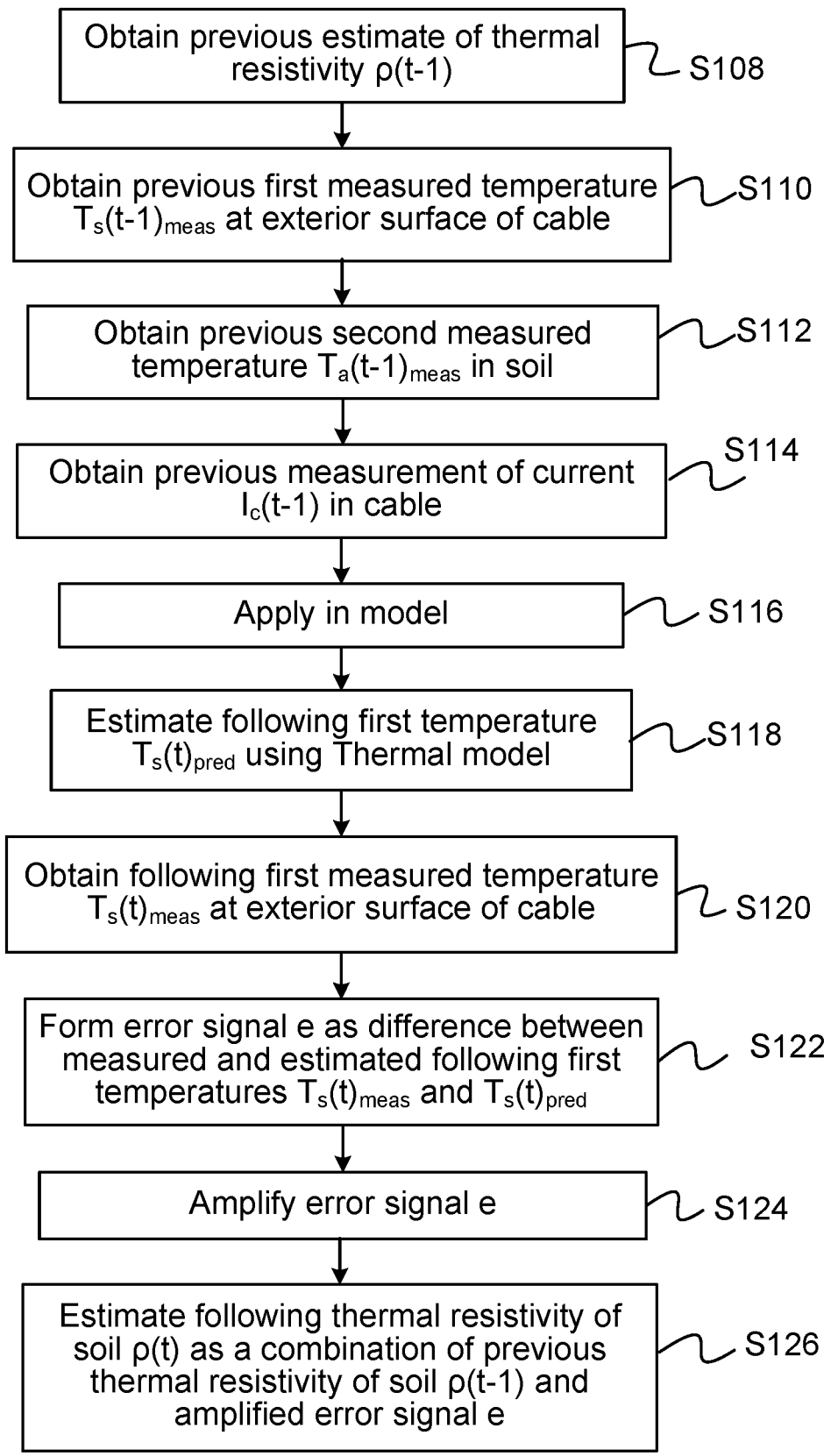
FIG. 7 shows a flow chart of a second embodiment of a method of estimating the thermal resistivity of the soil, which method steps are being performed in the thermal resistivity estimating unit.

A second embodiment will now be described with reference to FIGS. 5, 6 and 7, where FIG. 5 shows a scheme used for estimating the thermal resistivity of soil implemented by the thermal resistivity estimating unit 42, FIG. 6 schematically shows a thermal model of the cable employed in the estimating scheme and FIG. 7 shows a flow chart of a second embodiment of a method of estimating the thermal resistivity of soil, which method steps are being performed in the thermal resistivity estimating unit 42.

The thermal resistivity estimating unit 42 operates on measurements at different points in time. For a present point in time t, the thermal resistivity estimating unit 42 operates on measurements of both a previous point in time t−1 and measurements of a following point in time, which following point in time is the current or present point in time t. The thermal resistivity estimating unit 42 obtains or receives an estimated previous thermal resistivity of the soil $\rho(t-1)$ as a first input, a measured previous first temperature $T_s(t-1)_{meas}$ as a second input, a measured previous second temperature $T_a(t-1)_{meas}$ as a third input, a measured previous current input to the cable $I_c(t-1)$ as a fourth input, and a following or present measured first temperature $T_s(t)_{meas}$ as a fifth input, where the first, second, third and fourth inputs are inputs to a block 64 implementing a thermal model M and which as an output provides a predicted following first temperature $T_s(t)_{pred}$, i.e. a predicted temperature of the current point in time t, to a negative input terminal of a subtracting block 66. The first input, i.e. the estimated previous thermal resistivity of the soil $\rho(t-1)$, is also provided to a first input terminal of an adding block 70. The subtracting block 66 also has a positive input on which it receives the fifth input signal, i.e. the measured following first temperature $T_s(t)_{meas}$. The subtracting block 66 also supplies an error e to an amplifying block 68, which amplifies the error e with a gain K and supplies the amplified error e to a second input terminal of the adding block 70, which has an output on which it provides an estimated following thermal resistivity of the soil $\rho(t)$, which is the thermal resistivity estimated for the current point in time t.

FIG. 6 shows one realization of the thermal model, which is a thermal model of the cable and the soil up to the location of the second temperature sensor 30.

The model M comprises a number of thermal resistances R1, . . . , Rn, R(n+1), . . . and Rm and a number of thermal capacitances C0, C1, . . . , C(n−1), Cn, C(n+1), . . . , C(m−1) and Cm. Each cable material layer has a corresponding thermal resistance in the model, where in this case there are n layers and thus n thermal resistances of the layers and the soil has one or more thermal resistances in the model corresponding to one or more soil layers between the cable 22 and the second temperature sensor 30. In the present example there are m-n soil layers and thus m-n thermal resistances of the soil and thereby the number of thermal resistances in the model is m. In FIG. 6, a first thermal resistance R1 is associated with a first layer outside of the conductor 12. There is then a thermal resistance for each following layer of the cable. There is thereby an nth and final thermal resistance Rn of the cable. Then follows m-n thermal resistances of the soil. After the last thermal resistance Rn of the cable there is a first thermal resistance R(n+1) of the soil. There are then a number of following thermal resistances up until a final thermal resistance Rm of the soil, which is also the last thermal resistance of the model.

The thermal resistances of the different cable layers may be known. However, the thermal resistances of soil are typically not known.

The model further comprises a thermal capacitance C0 being the thermal capacitance of the conductor 10 and a part of a first neighbouring layer 12 and a last thermal capacitance Cm that is the thermal capacitance of the soil at the second temperature sensor 30 and half of a neighbouring last soil layer of the model. The thermal capacitances C1, ..., C(n−1), Cn, (C(n+1), ..., C(m−1) in-between the first and the last thermal capacitances C0 and Cm are made up of the capacitances of half of two neighbouring layers.

As can be seen in FIG. 6, the thermal resistances R1, ..., Rn, R(n+1), ..., Rm are connected in series in a string, where the first thermal capacitance C0 is connected to a first end of the string and the last thermal capacitance Cm is connected to a second opposite end of the string, with the rest of the thermal capacitances C1, ..., (Cn−1), Cn, C(n+1), ..., C(m−1) each being connected to a corresponding junction between two thermal resistances of the string. In the example of FIG. 6, the first thermal capacitance C0 is thus connected to a first end of the string formed by a first end of the first thermal resistance R1, the thermal capacitance C1 is connected to a first junction between a second end of the first thermal resistance R1 and a first end of a second thermal resistance (not shown), a capacitance C(n−1) is connected to a junction between a second end of an (n−1)th resistance (not shown) and a first end of an nth resistance Rn, a capacitance Cn is connected to a junction between the second end of the nth resistance Rn and a first end of the (n+1)th resistance R(n+1), a capacitance C(n+1) is connected to a junction between the second end of the (n+1)th resistance R(n+1) and a first end of an (n+2)th resistance (not shown) etc. Finally a capacitance C(m−1) is connected to a junction between a second end of an (m−1)th resistance (not shown) and a first end of the mth resistance Rm. The last thermal capacitance Cm is connected to a second end of the string which end is opposite to the first end. The second end of the string is in this case made up of a second end of the mth thermal resistance Rm.

In the model, the first temperature $T_s$ is the temperature at the junction in the model between the thermal resistance Rn of the last layer of the cable 22 and the thermal resistance R(n+1) of a first soil layer and the second temperature $T_a$ is the temperature after the thermal resistance Rm of a last soil layer in the model, which is also the last layer of the model.

There is in the model also a heat source HS connected in parallel with the first thermal capacitance C0, which heat source HS is provided by the conductor 10 and generates a heat flow HF that is fed into the model at the first end of the string of thermal resistances, which heat flow corresponds to the current $I_c$.

It should here be realized that the model may comprise more elements, such as more heat sources corresponding to other elements of the cable thermal temperature sources.

The model is a variation of the model defined in ELECTRA No 87, 1983, "Computer method for the calculation of the response of single-core cables to a step function transient", Paper presented by working group 21 02 of Study Committee 21 (HV Insulated Cables), which is herein incorporated by reference.

The estimation of the thermal resistivity in this second embodiment is iterative. This means that the estimation operates on measurements obtained at different points in time, i.e. sampling times. It also operates on previous estimates of the thermal resistivity of the soil.

Initially the thermal resistivity may be assigned a random non-zero value. As an alternative, the soil may originally be assigned a nominal thermal resistivity, for instance a thermal resistivity of the material obtained from general or laboratory measurements of the soil. The estimate of the resistivity is then improved with every iteration in the estimating scheme.

For a present time t, the thermal resistivity estimating unit 42 then operates on values of a previous time t−1. It more particularly operates on a thermal resistivity estimate p of this previous time t−1.

The operation may therefore involve the thermal resistivity estimating unit 42 obtaining the previous estimate of the thermal resistivity ρ(t−1), S108, which is the estimate made at the previous time t−1.

The thermal resistivity estimating unit 42 also obtains the first temperature $T_s$ from the first temperature sensor 26 at the exterior surface of the cable 22 and in the present case it obtains the previous measured temperature $T_s(t-1)_{meas}$ at the exterior surface of the cable 22, S110, which is the temperature detected by the first temperature sensor 26 and sampled at the previous point in time t−1. The thermal resistivity estimating unit 42 also obtains a previous second measured temperature $T_a(t-1)_{meas}$ in the soil, S112, which is the temperature measured by the second temperature sensor 30 and sampled at time t−1. The thermal resistivity estimating unit 42 also obtains a previous measurement of the current $I_c(t-1)$ transmitted in the cable 22, S114, i.e. the current measured by the current sensor 52 at time t−1.

The estimation of the thermal resistivity is in this case based on an estimate of the temperature at the exterior surface of the cable 22 caused by the power losses in the cable for the current $I_c$ running in the conductor of the cable 22. This is done through applying the measured temperatures and current in the model M of the cable 22 and the soil provided through the thermal model implementing block 64, S116.

In the example of the model M, a flow of heat HF corresponding to the measured current $I_c$ is provided by heat source HS to an input formed across the first thermal capacitance C0. The previous estimated resistivity ρ(t−1) may be used to obtain values of the thermal resistances of the soil R(n+1), ..., Rm and the previous first and second temperatures may be input as temperatures on either side of these thermal resistances R(n+1), ..., Rm. The thermal resistivity estimating unit 42 then estimates a following first temperature $T_s(t)_{pred}$ using the thermal model M in thermal model implementing block 64, S118. It thus enters the first, second, third and fourth inputs that are associated with the previous time t−1 in the model M and using this model it predicts the following first temperature $T_s(t)_{pred}$, which is the temperature of time t, the present time. The prediction my more particularly involve predicting the change of the first temperature due to the heat flow HF caused by the measured current $I_c(t-1)$. In this respect it can also be mentioned that as the second temperature is sensed at a distance from the cable that is uninfluenced by the heatflow HF, the second temperature will be considered to remain the same. The predicted first temperature $T_s(t)_{pred}$ is then provided to the subtracting block 66.

The estimation of the thermal resistivity is in this case based on a difference between the estimated first temperature and the measured first temperature at the exterior surface of the cable.

In the present case, this is done through the thermal resistivity estimating unit 42 obtaining the following measured temperature $T_s(t)_{meas}$ at the exterior surface of the cable 22, S120, which is the temperature detected by the first temperature sensor 26 and sampled at the present time t. This measured temperature is also provided to the subtracting block 66.

The subtracting block then forms an error e as a difference between the measured and estimated following first temperatures $T_s(t)_{meas}$ and $T_s(t)_{pred}$, S122. This error e is then amplified with a gain K in a following optional amplification block 68, S124, and the amplified error is provided to the adding block 70 as is the previously predicted thermal resistivity ρ(t−1), i.e. the thermal resistivity that was estimated at the previous point in time t−1.

The possibly amplified error e is then combined with the previous thermal resistivity estimate ρ(t−1), which combination may be an addition, where the result of the combination is the following estimated thermal resistivity ρ(t), i.e. the thermal resistivity estimated for the present time t.

Thereby the following thermal resistivity ρ(t) of the soil is determined as a combination of the previous estimate of the thermal resistivity ρ(t−1) of the soil and the possibly amplified error e, S126.

The estimating of the following thermal resistivity of the soil in this case thus involves a combination of the previous thermal resistivity of the soil and the difference between the measured following first temperature and the predicted following first temperature, where the prediction of the following first temperature has been made based on measurements made at the previous point in time.

This type of operation can then continue until the prediction of the thermal resistivity stabilizes.

After the thermal resistivity has been estimated, it may then be used by the overload operation determining unit 44 to determining of overload operating conditions identify that can be used in an overload operating mode. The determining of overload operating conditions may comprise determining a maximum overcurrent level, an overload power level and/or an overload time duration at which the cable may be operated in the overload operating mode. The overload operation determining unit 44 may then inform the high-level control computer 46 of the overload operating conditions and the high-level control computer may then use the information of the overload operation conditions in the control of the converter made via the low-level control device 48 in order to avoid the overload operating conditions from being violated.

Through the estimation of the thermal resistivity of the soil, it is possible to combine safe overload operation with low safety margins, which is due to a good estimate of the thermal resistivity. Thereby the cable can be more efficiently used compared with when no or an inadequate estimation of the thermal resistivity of soil is made. Furthermore, the sensors used are often required for the overload operation. This means that the invention can be implemented in a simple way using only additional software.

The first and second groups of temperature sensors may be used if the stability of the temperature at the exterior surface of the cable and at the distance to the cable are desired. The temperatures of the first group may be combined, such as averaged, and the temperatures of the second group may be combined, such as averaged, in order to obtain more stable temperatures in the estimation of the thermal resistivity of the soil.

As was mentioned earlier, the thermal resistivity estimating device may be provided in the form of a processor with associated program memory including computer program code for performing its functionality.

Figure 8:
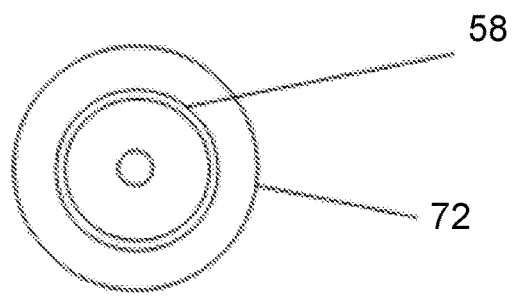
FIG. 8 shows a computer program product in the form of a CD ROM disc with computer program instructions for implementing the thermal resistivity estimating unit.

A computer program may also be a computer program product, for instance in the form of a computer readable storage medium or data carrier, like a CD ROM disc or a memory stick, carrying a computer program with the computer program code, which will implement the functionality of the above-described thermal resistivity estimating unit when being loaded into a processor. One such computer program product in the form of a CD ROM disc 72 with the above-mentioned computer program code 58 is schematically shown in FIG. 8.

A computer program product may also be a program provided via a server and downloaded therefrom to the thermal resistivity estimating device.

It should here be realized that the invention can be varied in more ways than was discussed above.

Although the invention has been described with reference to a DC cable, it should be realized that the teachings described herein may also be applied on an AC cable, such as an AC cable comprising three cores or three conductors.

Moreover, the shown thermal model is merely one example of a model that may be used. It is possible to use other models of the power loss through the cable. In the estimating scheme, it is possible to use a subtracting block instead of the adding block as well as to use an adding block instead of the subtracting block. Other types of combinations of the error with the previous estimate of the thermal resistivity than addition or subtraction are also possible. It is in fact possible to have a completely different estimating scheme.

It should also be realized that the overload operation determining unit 44 may be omitted from the thermal resistivity estimating arrangement. It is also possible to omit the signal collection device and the connection box.

Therefore, while the invention has been described in connection with what is presently considered to be most practical and preferred embodiments, it is to be understood that the invention is not to be limited to the disclosed embodiments, but on the contrary, is intended to cover various modifications and equivalent arrangements. Therefore, the invention is only to be limited by the following claims.

The invention claimed is:

1. A method for estimating the thermal resistivity of soil surrounding an underground cable, the method being performed by a thermal resistivity estimating unit and comprising:
   obtaining a first temperature ($T_s$) from a first temperature sensor at an exterior surface of the cable,
   obtaining a second temperature ($T_a$) from a second temperature sensor placed in the soil at a distance from the cable,
   obtaining a measurement of current ($I_c$) transmitted in the cable, and
   estimating the thermal resistivity of the soil based on the first and the second temperatures ($T_s$, $T_a$) as well as on the current measurement ($I_c$),
   wherein the estimation of the thermal resistivity of the soil is based on an estimate of the temperature at the exterior surface of the cable caused by power losses in the cable when the measured current ($I_c$) is running in the cable.

2. The method according to claim 1, wherein the estimation of the thermal resistivity of the soil is based on applying the current measurement and the temperatures in a thermal model of the cable and also of the soil.

3. The method according to claim 1, wherein the estimation of the thermal resistivity of the soil is based on a difference between the estimated temperature and the obtained temperature at the exterior surface of the cable.

4. The method according to claim 3, wherein the estimation of the thermal resistivity of the soil is iterative and involves predicting a following thermal resistivity of the soil based on a combination of a previous thermal resistivity of the soil and the difference between the estimated temperature and the obtained temperature at the exterior surface of the cable.

5. The method according to claim 1, wherein the estimation of the thermal resistivity of the soil is based on applying the current measurement and the temperatures in a thermal model (M) of the cable.

6. The method according to claim 5, wherein the estimation of the thermal resistivity of the soil is iterative and involves predicting a following thermal resistivity of the soil based on a combination of a previous thermal resistivity of the soil and the difference between the estimated temperature and the obtained temperature at the exterior surface of the cable, and wherein the step of estimating comprises applying a previous estimate of the thermal resistivity ($\rho(t-1)$) of the soil in the model together with a previous current measurement ($I_c(t-1)$) and previous first and second temperatures ($T_s(t-1)_{meas}$, $T_a(t-1)_{meas}$) and obtaining a following estimate of the thermal resistivity ($\rho(t)$) of the soil based on processing of the previous thermal resistivity ($\rho(t-1)$) of the soil, the previous current measurement ($I_c(t-1)$) and the previous first and second temperatures ($T_s(t-1)_{meas}$, $T_a(t-1)_{meas}$) in the model (M).

7. The method according to claim 6, wherein the application of the current measurement and the temperatures in the thermal model provides an estimated following first temperature ($T_s(t)_{pred}$), wherein the estimated following thermal resistivity ($\rho(t)$) of the soil is determined as a combination of the previous thermal resistivity ($\rho(t-1)$) of the soil and an amplified error (e), and wherein the amplified error (e) is the difference between a measured following first temperature ($T_s(t)_{meas}$) and the estimated following first temperature ($T_s(t)_{pred}$).

8. The method according to claim 5, wherein the cable comprises a number of layers of cable material around at least one conductor, where the model comprises a number of thermal resistances (R1, ..., Rn, R(n+1), ..., Rm) and a number of thermal capacitances (C0, C1, ..., C(n−1), Cn, C(n+1), ..., C(m−1), Cm), each cable material layer having a corresponding thermal resistance (R1, ..., Rn) in the model and the soil having one or more thermal resistances (Rn+1, ..., Rm) in the model corresponding to one or more soil layers between the cable and the second temperature sensor, a first thermal capacitance (C0) being the thermal capacitance of the conductor and a part of a first neighbouring layer, the last thermal capacitance (Cm) being the thermal capacitance of the soil at said second temperature sensor and half of a neighbouring soil layer, where the thermal capacitances (C1, ..., C(n−1), Cn, C(n+1), ..., C(m−1)) in-between the first and the last thermal capacitances (C0, Cm) are made up of the capacitances of half of two neighbouring layers.

9. The method according to claim 8, wherein the thermal resistances (R1, ..., Rn, R(n+1), ..., Rm) are connected in series in a string, the first thermal capacitance (C0) being connected to a first end of the string and the last thermal capacitance (Cm) being connected to a second opposite end of the string, with the rest of the thermal capacitances (C1, ..., C(n−1), Cn, C(n+1), ..., C(m−1)) each being connected to a corresponding junction between two thermal resistances of the string.

10. The method according to claim 9, wherein the first temperature ($T_s$) is the temperature at the junction in the model between the thermal resistance (Rn) of the last layer of the cable and the thermal resistance (R(n+1)) of a first soil layer and the second temperature ($T_a$) is the temperature after the thermal resistance (Rm) of a last soil layer.

11. An arrangement for estimating the thermal resistivity of soil, the arrangement comprising:
a thermal resistivity estimating unit configured to:
obtain a first temperature ($T_s$) from a first temperature sensor at an exterior surface of a cable,
obtain a second temperature ($T_a$) from a second temperature sensor placed in the soil at a distance from the cable,
obtain a measurement of current ($I_c$) transmitted in the cable, and
estimate the thermal resistivity of the soil based on the first and the second temperatures ($T_s$, $T_a$) as well as on the current measurement ($I_c$),
wherein the estimation of the thermal resistivity of the soil is based on an estimate of the temperature at the exterior surface of the cable caused by power losses in the cable when the measured current ($I_c$) is running in the cable.

12. The arrangement according to claim 11, further comprising an overload operation determining unit configured to determine overload operating conditions based on the estimated thermal resistivity of the soil.

13. The arrangement according to claim 11, further comprising the first sensor and the second sensor.

14. The arrangement according to claim 13, further comprising the cable.

15. A computer program for estimating the thermal resistivity of soil surrounding an underground cable, the computer program comprising computer program code which, when run by a processor of a thermal resistivity estimating device, causes the thermal resistivity estimating device to:
obtain a first temperature ($T_s$) from a first temperature sensor at an exterior surface of the cable,
obtain a second temperature ($T_a$) from a second temperature sensor placed in the soil at a distance from the cable,
obtain a measurement of current ($I_c$) transmitted in the cable, and
estimate the thermal resistivity of the soil based on the first and the second temperatures ($T_s$, $T_a$) as well as on the current measurement ($I_c$),
wherein the estimation of the thermal resistivity of the soil is based on an estimate of the temperature at the exterior surface of the cable caused by power losses in the cable when the measured current ($I_c$) is running in the cable.

16. A computer program product for estimating the thermal resistivity of soil surrounding an underground cable, the computer program product comprising a data carrier with a computer program code which, when run by a processor of a thermal resistivity estimating device, causes the thermal resistivity estimating device to:
obtain a first temperature ($T_s$) from a first temperature sensor at an exterior surface of the cable,
obtain a second temperature ($T_a$) from a second temperature sensor placed in the soil at a distance from the cable,
obtain a measurement of current ($I_c$) transmitted in the cable, and
estimate the thermal resistivity of the soil based on the first and the second temperatures ($T_s$, $T_a$) as well as on the current measurement ($I_c$),
wherein the estimation of the thermal resistivity of the soil is based on an estimate of the temperature at the exterior surface of the cable caused by power losses in the cable when the measured current ($I_c$) is running in the cable.

* * * * *